(12) United States Patent
Moth et al.

(10) Patent No.: US 12,012,134 B2
(45) Date of Patent: *Jun. 18, 2024

(54) SYSTEM AND METHOD FOR MAPPING A RAILWAY TRACK

(71) Applicant: Fugro Technology B.V., Leidschendam (NL)

(72) Inventors: Luke William Moth, Leidschendam (NL); Martinus Pieter Kodde, Leidschendam (NL); Sander Christiaan Florisson, Leidschendam (NL); Adrianus Franciscus Wilhelmus Berkers, Leidschendam (NL)

(73) Assignee: Fugro Technology B.V., Leidschendam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,948

(22) Filed: Jan. 9, 2023

(65) Prior Publication Data

US 2023/0202541 A1    Jun. 29, 2023

Related U.S. Application Data

(63) Continuation of application No. 16/611,457, filed as application No. PCT/NL2018/050304 on May 9, 2018, now Pat. No. 11,548,541.

(30) Foreign Application Priority Data

May 12, 2017 (NL) ...................................... 2018911

(51) Int. Cl.
*B61L 23/04* (2006.01)
*B61L 27/70* (2022.01)
*G01S 17/89* (2020.01)

(52) U.S. Cl.
CPC ............. *B61L 23/042* (2013.01); *B61L 27/70* (2022.01); *G01S 17/89* (2013.01)

(58) Field of Classification Search
CPC .... B61L 23/041; B61L 23/042; B61L 23/047; B61L 23/048; B61L 25/025; B61L 2205/04; B61L 27/70; G01S 17/89
See application file for complete search history.

(56) References Cited

U.S. PATENT DOCUMENTS

| | | | | |
|---|---|---|---|---|
| 11,548,541 | B2 * | 1/2023 | Moth | ....................... G01S 17/89 |
| 2012/0179309 | A1 * | 7/2012 | Wilson | ................ G06F 16/2365 701/19 |
| 2014/0176711 | A1 * | 6/2014 | Kirchner | ............... B61L 25/025 348/148 |

(Continued)

*Primary Examiner* — Michael J Dalbo
(74) *Attorney, Agent, or Firm* — Polsinelli PC

(57) ABSTRACT

A method and a system (30) for inspecting and/or mapping a railway track (18). The method comprises: acquiring geo-referenced rail geometry data associated with geometries of two rails (20) of the track along the section; acquiring geo-referenced 3D point cloud data, which includes point data corresponding to the two rails and surroundings of the track along the section; deriving track profiles of the track from the geo-referenced 3D point cloud data and the geo-referenced rail geometry data; and comparing the track profiles and generating enhanced geo-referenced rail geometry data and/or enhanced geo-referenced 3D point cloud data based on the comparison.

18 Claims, 5 Drawing Sheets

(56) References Cited

U.S. PATENT DOCUMENTS

| | | | |
|---|---|---|---|
| 2016/0082991 A1* | 3/2016 | Warta | B61L 27/53 |
| | | | 246/167 R |
| 2016/0221592 A1* | 8/2016 | Puttagunta | B61L 25/025 |
| 2017/0160746 A1* | 6/2017 | Rao | B61L 3/002 |
| 2018/0165532 A1* | 6/2018 | Menon Gopalakrishna | |
| | | | B61L 15/0072 |
| 2018/0339720 A1* | 11/2018 | Singh | G06T 7/001 |
| 2019/0146520 A1* | 5/2019 | Naithani | B60W 30/18009 |
| | | | 701/28 |

* cited by examiner

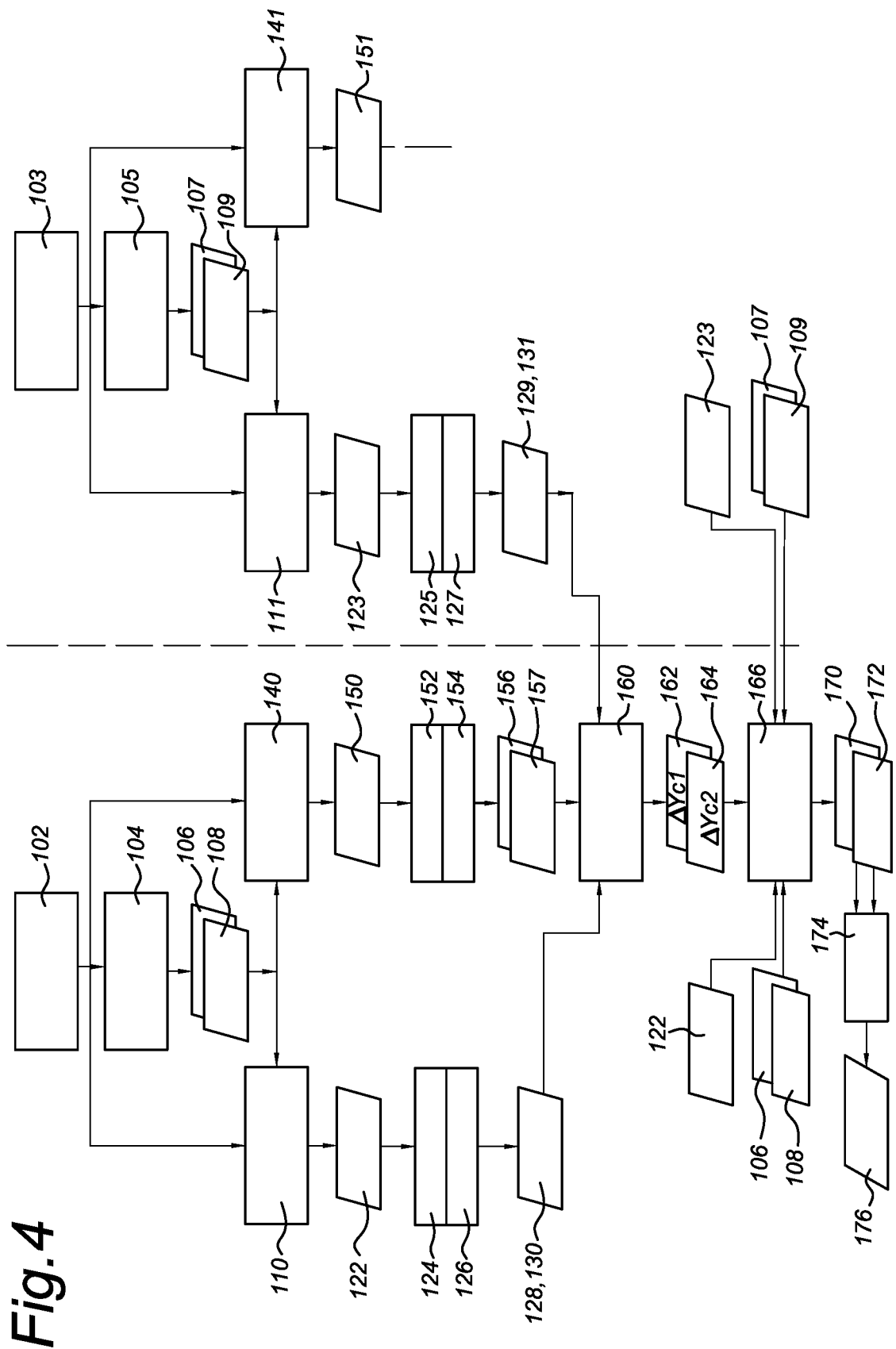

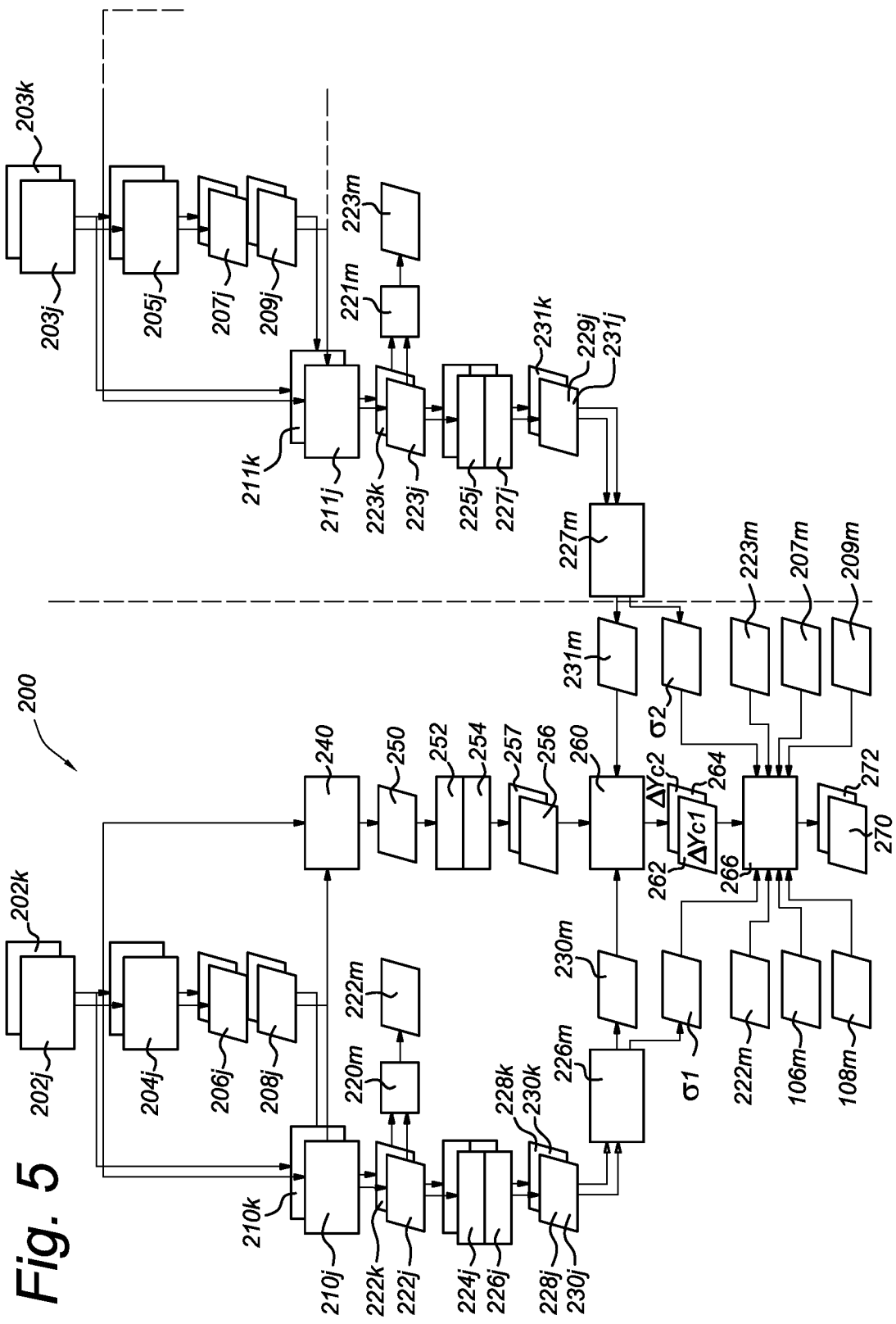

//<br>
SYSTEM AND METHOD FOR MAPPING A RAILWAY TRACK

TECHNICAL FIELD

The invention relates to a system and a method for mapping a railway track. Furthermore, the invention relates to a computer program product arranged to perform the proposed method, and a computer readable medium comprising such a computer program.

BACKGROUND ART

Railway tracks require regular inspection to allow timely detection of problems relating to impending track failure. Failure or misalignment of the track may be caused by wear of the rails, deterioration of the sleepers, damaged or disconnected rail fasteners, or by displacement (e.g. subsidence) of the track bed or underlying soil and support structures.

Systems and methods for automated inspection of railway tracks and analyzing inspection data are known. One goal of such automated systems is non-destructive and high-speed assessment of railway tracks. Inspection systems typically use sources of coherent light to illuminate regions of the railway track during inspection runs.

Patent document WO2009/064177A1 describes an appliance for measuring rail geometry, which can be quickly attached to an automatic coupling of a standard train wagon in such a way that it is completely carried by the automatic coupling. The known appliance comprises a laser measuring system for measuring a location of the rail relative to the appliance, and an inertial measuring system for determining the geographic location of the appliance. Combination of the geographic location of the appliance and position of the rail relative to the appliance allows determination of the geographic position of the rail. WO2009/064177A1 provides little information in relation to the imaging and mapping of the railway track.

It would be desirable to provide a system and a method that allow mapping of a railway track with high accuracy.

SUMMARY OF INVENTION

The invention provides a system and a method for mapping the geometry of a railway track using railway vehicle mounted equipment. The system and method allow accurate mapping of railway track geometry, and detection of various rail displacements and irregularities.

According to a first aspect, there is provided a method for mapping a section of a railway track. The method comprises:—acquiring geo-referenced rail geometry data associated with geometries of two rails of the track along the section; —acquiring geo-referenced three-dimensional (3D) point cloud data, which includes point data corresponding to the two rails and surroundings of the track along the section; —deriving track profiles of the track from the geo-referenced 3D point cloud data and the geo-referenced rail geometry data, and—comparing the track profiles and generating enhanced geo-referenced rail geometry data and/or enhanced geo-referenced 3D point cloud data based on the comparison.

According to an embodiment, the geo-referenced 3D point cloud data includes point data corresponding to two further rails along a co-extending section of an adjacent railway track. The method may comprise:—acquiring further geo-referenced rail geometry data associated with geometries of the two further rails of the adjacent railway track; —deriving further track profiles of the adjacent track from the geo-referenced 3D point cloud data and the further geo-referenced rail geometry data. The comparing may then include determining distance profiles associated with transverse distances and/or elevation differences between the track profiles and the further track profiles. The generating may then be based on the distance profiles.

According to a further embodiment, the track profiles comprise a first centerline profile of the track in the geo-referenced rail geometry data, and a second centerline profile of the track in the geo-referenced 3D point cloud data. The further track profiles comprise a further centerline profile of the adjacent track in the further geo-referenced rail geometry data, and an adjacent centerline profile of the adjacent track in the geo-referenced 3D point cloud data. The distance profiles may then comprise a first distance profile defined between the first centerline profile and the further centerline profile, and a second distance profile defined between the second centerline profile and the adjacent centerline profile.

According to further embodiments, generating the enhanced geo-referenced rail geometry data includes adjusting geo-reference correspondences for the geo-referenced rail geometry data and the further geo-referenced rail geometry data, to let the first distance profile converge towards the second distance profile.

According to yet a further embodiment, the geo-reference correspondences are adjusted based on weighted contributions, including a first weight associated with the track profile of the track in the geo-referenced rail geometry data, and a second weight associated with the further track profile of the adjacent track in the further geo-referenced rail geometry data.

According to embodiments, the geo-referenced rail geometry data comprises a plurality of overlapping data sets associated with the section of the track, and the track profile is an average of track profiles for the overlapping data sets. In addition, the further geo-referenced rail geometry data may comprise a plurality of further overlapping data sets associated with the co-extending section of the adjacent track, and the further track profile is an average of further track profiles for the further overlapping data sets.

According to a further embodiment, the first weight is a quantity of dispersion for the overlapping data sets with respect to the average of the track profiles. The second weight is a quantity of dispersion for the further overlapping data sets with respect to the average of the further track profiles.

According to further embodiments, generating the enhanced geo-referenced 3D point cloud data includes adjusting geo-reference correspondences for the geo-referenced 3D point cloud data, to let the second centerline profile and adjacent centerline profile converge towards the first centerline profile and the further centerline profile, respectively.

According to embodiments, the method comprises generating composite track data by merging the enhanced geo-referenced rail geometry data and the enhanced geo-referenced 3D point cloud data into a single dataset.

According to embodiments, acquiring geo-referenced rail geometry data comprises: —acquiring orientation data and position data at a plurality of locations along the section of the track; —acquiring two-dimensional (2D) images including outlines of both rails at or near the plurality of locations along the track, and—generating the geo-referenced rail geometry data, by combining the set of 2D images with the orientation and position data.

In a further embodiment, acquiring 2D images comprises:—projecting at least one collimated light beam towards each or both of the two rails of the track, and—receiving reflected beam portions from the respective rails, to acquire reflection image data at or near the plurality of locations along the section of the track;

In an alternative further embodiment, acquiring 2D images comprises:—scanning at least one laser beam transversely across each or both of the two rails, and—receiving reflected beam portions from the respective rails, to acquire ranging data at or near the plurality of locations along the section of track.

According to embodiments, acquiring geo-referenced 3D point cloud data comprises: —acquiring orientation data and position data at a plurality of locations along the section of the track; —scanning a laser beam across the two rails and a portion of the surroundings of the track; —detecting reflections of the laser beam from the two rails and the surroundings, to acquire ranging data that includes point data corresponding to the two rails and surroundings along the section of the track, and—generating the geo-referenced 3D point cloud data by combining the ranging data with the orientation and position data.

According to a further embodiment, acquiring georeferenced 3D point cloud data further comprises:—scanning the laser beam across two further rails of a co-extending section of an adjacent railway track, and; —detecting reflections of the laser beam from the two further rails, so that the acquired ranging data also includes point data corresponding to the two further rails along the co-extending section of the adjacent track.

According to a second aspect, there is provided a system for mapping a section of a railway track, which is configured to execute the method according to the first aspect.

The system may comprise:—a positioning device configured to acquire orientation data and position data at a plurality of locations along the section of the track while the system is moved along the track; —a first acquisition device configured to acquire 2D images including outlines of two rails at or near the plurality of locations; —a second acquisition device configured to acquire 3D laser ranging data including point data corresponding to the two rails and surroundings along the section of the track, and—a processing device. This processing device is configured to: —generate geo-referenced rail geometry data associated with geometries of two rails of the track along the section, by combining the set of 2D images with the orientation and position data; —generate geo-referenced 3D point cloud data, which includes point data corresponding to the two rails and surroundings of the track along the section; —derive track profiles for the track from the geo-referenced 3D point cloud data and the geo-referenced rail geometry data, and—compare the track profiles and generate enhanced geo-referenced rail geometry data and/or enhanced geo-referenced 3D point cloud data based on the comparison.

According to an embodiment, the second acquisition device is a laser scanner, which is configured to scan a laser beam across the two rails and a portion of the surroundings of the track, and across two further rails of a co-extending section of an adjacent railway track, and configured to detect laser beam reflections and acquire ranging data that includes point data corresponding to the two rails and the surroundings along the section of the track, as well as the two further rails along the co-extending section of the adjacent track.

According to embodiments, the system comprises a frame with a mounting mechanism for attaching the system to a railway vehicle, wherein the positioning device, the first acquisition device, and the second acquisition device are fixed to the frame at predetermined positions.

According to a third aspect, there is provided a railway vehicle including:—a vehicle coupling mechanism at a front side or rear side of the railway vehicle, and—a system for mapping a railway track according to the second aspect, and attached to the railway vehicle via the coupling mechanism.

According to a fourth aspect, there is provided a computer program product configured to provide instructions to carry out a method according to the first aspect, when loaded on a computer arrangement.

According to a fifth aspect, there is provided a computer readable medium, comprising a computer program product according to the fourth aspect.

BRIEF DESCRIPTION OF DRAWINGS

Embodiments will now be described, by way of example only, with reference to the accompanying schematic drawings in which corresponding reference symbols indicate corresponding parts. In the drawings, like numerals designate like elements. Multiple instances of an element may each include separate letters appended to the reference number. For example, two instances of a particular element "20" may be labeled as "20a" and "20b". The reference number may be used without an appended letter (e.g. "20") to generally refer to an unspecified instance or to all instances of that element, while the reference number will include an appended letter (e.g. "20a") to refer to a specific instance of the element.

FIG. 4 presents a flow diagram of a railway mapping method according to a further embodiment, and FIG. 5 presents a flow diagram of a railway mapping method according to another embodiment.

Figure 1:
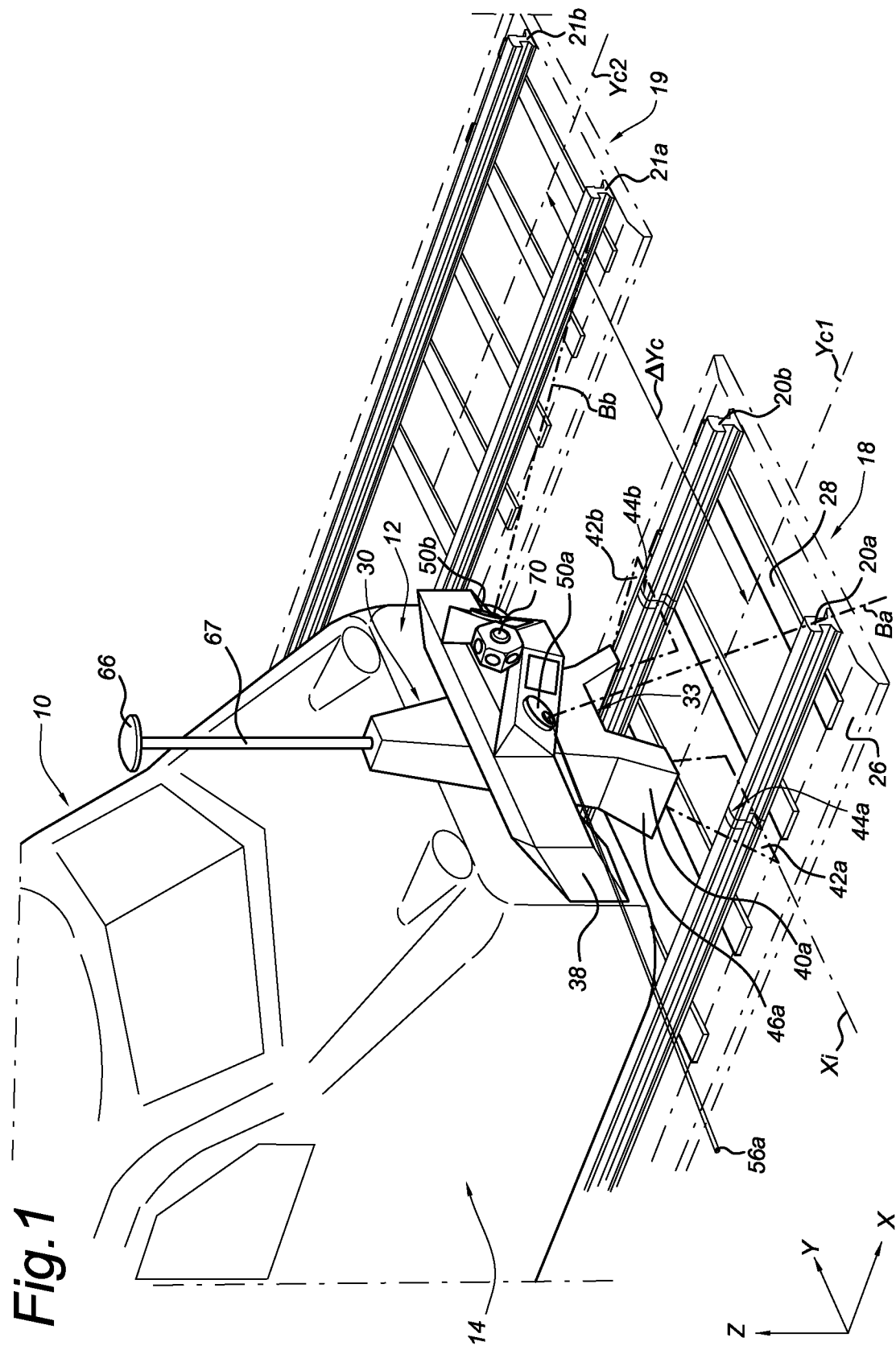
FIG. 1 presents a schematic perspective view of a railway inspection system according to an embodiment.

The figures are meant for illustrative purposes only, and do not serve as restriction of the scope or the protection as laid down by the claims.

DESCRIPTION OF EMBODIMENTS

The following is a description of certain embodiments of the invention, given by way of example only and with reference to the figures. It may be helpful to an understanding of the invention to set forth definitions of certain terms to be used herein.

The terms "track", "railway track", and "railroad track" are used herein interchangeably, to refer to a railway portion including two rails, the interconnecting (cross-)ties, the components that fix the rails to the ties, and ballast material.

The term "mapping" (in relation to the track and/or its surroundings), is used in a broad sense to indicate coordinate-referenced imaging of the track and/or its surroundings, and/or coordinate-referenced description of railway track parameters (e.g. gauge, centerline, cant).

The term "(rail) gauge" is used herein to indicate a transversal distance (width) between the inner gauge surfaces of the two rails belonging to the same track. Unless explicitly indicated otherwise, this term refers to a local gauge, which is represented by a parameter value that may vary along the track. Typically, such variations must remain within a predetermined range of acceptable gauge values.

The term "(track) centerline point" is used herein to indicate a nominal point at exactly half the rail gauge away from the inner gauge surface of either rail of the same track. The centerline point is a local spatial characteristic of the track. A collection of local track centerline points belonging to the same track may be combined to form a "(track) centerline", which defines a three-dimensional trajectory associated with this track.

The term "(track) cant" is used herein to indicate a height difference between the upper surfaces of the two rails belonging to the same track. Unless explicitly indicated otherwise, this term refers to a local cant, which is represented by a parameter that may vary along the track. Typically, such variations must remain within a predetermined range of acceptable cant values, for example within a range of −150 millimeters to +150 millimeters (including end points). In a straight portion of the track, the local cant is preferably close or even equal to 0 millimeters.

The term "surroundings of the track" refers herein to a region that directly surrounds the track within a horizontal distance of at least 10 meters from the track centerline. One or more neighboring tracks may be present within this surrounding region, and the track and its neighboring track (s) may be imaged simultaneously. The achievable coverage of the surrounding region depends on the achievable range and scanning resolution of the image acquisition devices. Preferably, the surrounding region covers an area within a horizontal distance of up to 25 meters from the track centerline, or more.

The term "outline" is used herein to refer to a curve corresponding to the outer boundary surface of a body. The term "surface" is used herein to generally refer to a two-dimensional parametric surface region, which may have an entirely flat (i.e. a plane) or piece-wise flat shape (e.g. a polygonal surface), a curved shape (e.g. cylindrical, spherical, parabolic surface, etc.), a recessed shape (e.g. stepped or undulated surface), or a more complex shape. The term "plane" is used herein to refer to a flat surface that is unambiguously defined by three non-collinear points.

In the next figures, a local system with Cartesian coordinates will be used to describe spatial relations for exemplary embodiments of the inspection system and method. The longitudinal direction X corresponds to the local direction of movement of the railway vehicle or inspection system along the track. Transversal direction Y is perpendicular to the longitudinal direction X, and vertical direction Z is perpendicular to X and Y. The terms "front" and "rear" relate to longitudinal direction X, "left", "right", "lateral" relate to transversal direction Y, and to "above" and "below" relate to vertical direction Z. It should be understood that the directional definitions and preferred orientations presented herein merely serve to elucidate geometrical relations for specific embodiments. The concepts of the invention discussed herein are not limited to these directional definitions and preferred orientations. Similarly, directional terms in the specification and claims are used herein solely to indicate relative directions and are not otherwise intended to limit the scope of the invention or claims.

Figure 2:
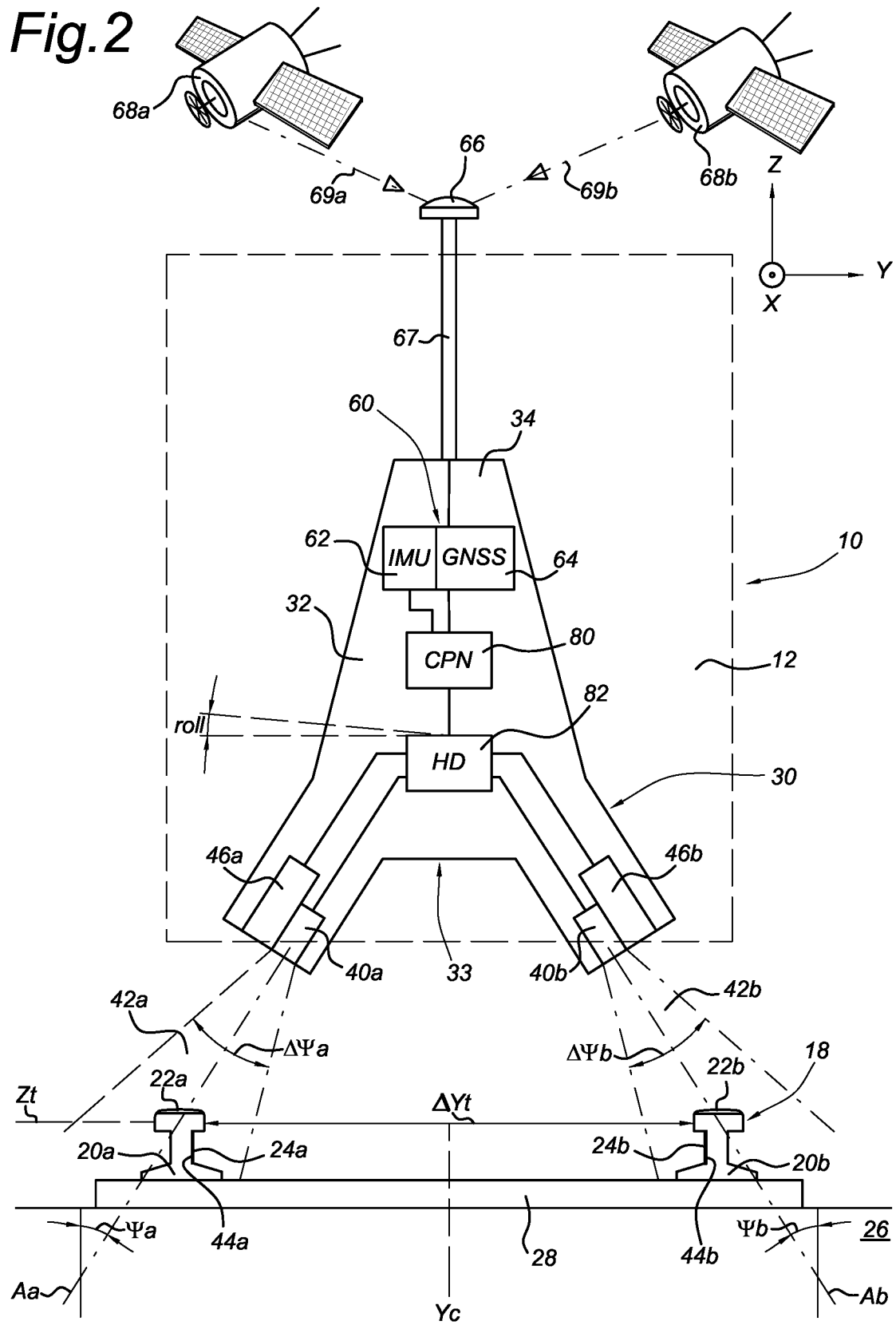
FIG. 2 presents a frontal cross-section of the railway inspection system from FIG. 1.

FIG. 1 schematically shows a perspective view of an embodiment of a system 30 for mapping a railway track 18. FIG. 2 presents a frontal cross-section of this railway mapping system 30. The system 30 is configured to survey the track 18 and to acquire data relating to the geometry of the track 18 and objects in the direct vicinity of the track 18, and further data relating to position and/or orientation of the system 30 relative to the track 18. The track 18 includes a first rail 20a and a second rail 20b, which are interconnected and held in place by a plurality of crossties 28, and which are supported by an underlying track bed 26. A second railway track 19 with two rails 21a, 21b extends alongside the track 18.

The exemplary system 30 shown in FIG. 1 comprises two light projector devices 40a, 40b (e.g. laser fan beam projectors) for generating and projecting collimated light beams 42a, 42b towards the track 18, two image acquisition devices 46a, 46b (e.g. cameras) for receiving light reflected by the rails 20a, 20b, two laser scanners 50a, 50b for acquiring three-dimensional image data of the surroundings, a positioning device 60 for acquiring the position/orientation data, a processing device 80, and a data storage device 82.

The inspection system 30 comprises a rigid frame 32, to which the light projectors 40, the cameras 46, and the laser scanners 50 are attached at predetermined positions. The inspection system 30 also includes a mounting mechanism 38 for releasably attaching the inspection system 30 with its frame 32 to a railway vehicle 10, which is adapted for travel over and along the railway track 18. In the coupled state, the mounting mechanism 38 allows the inspection system 30 to be moved as an integrated unit together with the railway vehicle 10, as the vehicle 10 moves on and along the track 18. In this exemplary embodiment, the mounting mechanism 38 is adapted to be mounted to the automatic coupling of a standard train wagon, at a front or rear side thereof.

The exemplary system 30 shown in FIGS. 1 and 2 is configured to execute various method steps, and to acquire, generate and/or process various data types during method execution. Method steps and data types will be discussed with reference to FIGS. 3-5, and indicated with reference numerals preceded by 100 or 200 thereof.

In the exemplary system 30, the processing device 80 is installed in an enclosed center region of the frame 32. In alternative system embodiments, the processing device may be an integral part of the camera system 46 or the laser scanner system 50. In yet alternative system embodiments, the processing device may be part of a computer device that is not mechanically coupled to the frame 32, but which forms a spatially separate unit. Such a computer device is provided with a data communication interface, which allows data acquired and generated by the system 30 to be retrieved and processed remotely, either via real-time processing or via offline (post-)processing.

Similarly, the data storage device 82 forms a distinct storage unit that is installed in the enclosed center region of the frame 32, and which allows the data acquired and generated by the system 30 to be stored for further processing purposes. In alternative systems that are configured for real-time processing by a remote computer device, the storage device may function as a temporary data buffer, while acquired and/or generated data is scheduled for transmission to the remote computer device. The acquired and/or generated data may then be transmitted (e.g. via a 3G, 4G, or WiFi-based communication device) to the remote computer, while the inspection run is still in progress. In yet alternative system embodiments that are configured for offline processing by a remote computer device, the storage device may have a considerable data storage capacity, so that all the data that is acquired and/or generated during inspection runs can be stored and transferred to the remote computer device after the inspection runs have been completed.

During an inspection run, the train 10 and the system 30 are moved along the track 18 (or the second track 19). The positioning device 60 includes an inertial measurement unit (IMU) 62 and a Global Navigation Satellite System (GNSS) receiver 64. In the exemplary system 30 shown in FIGS. 1-2, the IMU 62 is installed in an enclosed center region of the frame 32, at a predetermined fixed position relative to the frame 32. The IMU 62 is configured to dynamically gather data 106 of the relative orientation of the IMU 62 and the frame 32 as a function of time. The IMU 62 may comprise gyroscopes, to measure pitch, roll, and yaw angles of the frame 32 relative to a preset reference orientation. Alternatively or in addition, the IMU 62 may comprise accelerometers for recording and integrating accelerations of the frame 32, to calculate displacements of the frame 32 relative to a preset reference.

In this example, the GNSS receiver 64 is also installed in the enclosed center region of the frame 32, at a predetermined fixed position relative to the frame 32. The GNSS receiver 64 is coupled to and in signal communication with a GNSS antenna 66, which is fixed to an upper side 34 of the frame 32 via a pole 67. The GNSS receiver 64 and antenna 66 are jointly configured to receive GNSS signals 69 from a plurality of GNSS satellites 68, and to use these GNSS signals 69 to dynamically determine geospatial positions of the GNSS receiver 64 and the fame 32, while the mapping system 30 is moved along the track 20. The associated system position data 108 is continuously collected and stored in the storage device 82. The GNSS antenna 66 is located at a non-zero distance above the upper frame side 34, to reduce interference effects for the received GNSS signal 69 caused by the train 10 (e.g. by partial EM shielding and/or multipath effects). In this example, the vertical distance is about 110 centimeters. In other embodiments, the GNSS antenna may be positioned at different vertical distances, depending on train type, regulations, or other conditions.

The processing device 80 is in signal communication with the IMU 62 and the GNSS receiver 64, to receive the orientation data 106 and the position data 108. The orientation data 106 and position data 108 are combined by the processing device 80, in order to accurately determine relative positions and orientations of the system 30 as a function of time, while the system 30 travels with the train 10 along the track 18.

In this example, the two light projector devices 40 are laser projectors 40, which are configured to generate respective fan beams 42a, 42b. The term "fan beam" refers herein to a beam of light that propagates along a central axis A, and which has asymmetric cross-sectional intensity profiles in planes perpendicular to this axis A. These cross-sectional intensity profiles are elongated, with a first characteristic dimension in a perpendicular direction that is at least an order of magnitude larger than a second characteristic dimension in the other perpendicular direction. The cross-sectional intensity profiles may for example have a rectangular, elliptical, or stadium shape. The cross-sectional intensity profile of the fan beam may widen as it propagates along the central axis A. An angular spread $\Delta\psi$ may be used to (approximately) describe the divergence of the first characteristic dimension along the axis A.

The lasers projectors 40 may comprise laser sources with a peak optical output power of 1 Watt. The processing device 80 may be in signal communication with the laser projectors 40, and configured to control light emission characteristics, such as light intensity parameters and/or directionality and width of the generated fan beams 42. Each laser projector 40 is positioned at a lower side 33 of the frame 32, and is configured to project its fan beam 42 with a downwards component (in the negative vertical direction −Z) towards a portion of the track 18 including at least one of the rails 20a, 20b. In this example, the fan beams 42 are aimed to cover at least an upper edge portion 22 and an inner lateral edge portion 24 of the associated rail 20. Preferably, each light projector 40 projects its fan beam 42 in a slant direction along a substantially vertical imaging plane along the transversal and vertical directions Y and Z. Each fan beam 42 extends along its axis A, which is tilted at an angle $\psi$ of about 30° with respect to the vertical direction Z, and has an angular spread $\Delta\psi$ of about 750 in the image plane around the axis A. The fan beam 42 intersects the corresponding rail 20 in such a way that the larger characteristic dimension of the fan beam 42 extends essentially perpendicular to the longitudinal direction X of the rail 20.

A portion of the field of each fan beam 42 will be reflected off the corresponding rail 20 and the track bed 26. This creates light reflection curves 44a, 44b on the rails 20 and the track bed 26, which follow the local surface contours of the rails 20 and the track bed 26.

As shown in FIG. 2, the two cameras 46a, 46b are also fixed to the lower side 33 of the frame 32. Each camera 46 is positioned diagonally above a respective rail 20 of the track 18. Two distinct camera positions are used to capture reflection image data 116 for each of the two rails 20, at or near various positions Xi along the track 18 (i being a discrete index). The first camera 46a is directed with its optical axis towards the expected mean position of the first rail 20a, and the second camera 46b is directed with its optical axis towards the expected mean position of the second rail 20b. The cameras 46 are configured to capture reflection image data 116 of the associated light reflection curves 44 on the rails 20 and the track bed 26.

The cameras 46 are optically sensitive in a wavelength range that overlaps with the wavelength distribution in the fan beams 42. For example, the cameras 46 may sense visible light emitted by optical light projectors 40. Alternatively or in addition, infrared lasers and infrared cameras may be used. The cameras 46 may include band-pass filters that allow only the electromagnetic wavelengths of the light projectors 40 to pass, while rejecting other wavelengths, in order to reduce image noise from ambient light conditions. The cameras 46 are each configured to sample reflection image data 116 at a high resolution (e.g. >1 Megapixel) and at a significant frame rate (e.g. a rate of about 500 frames per second). In this exemplary system, the inter-image spatial resolution along the track 18 can be characterized by distance intervals $\Delta x$ between two adjacent reflection curve images in the image data set 116, which are acquired at or near the positions Xi along the track 18. For a train 10 that travels in the longitudinal direction X along the track 18 at a speed v in a range between 50 to 150 kilometers per hour, the inter-image spatial resolution is expected to be in a range of about 0.03 meters to 0.08 meters.

The cameras 46 are in signal communication with the data storage device 82, to transmit the acquired rail reflection image data 116 and allow the storage device 82 to store such rail reflection image data 116 for further processing purposes. In turn, the data storage device 82 is in signal communication with the processing device 80, to provide stored rail reflection image data 116 to the processing device 80 on request.

The processing device 80 is configured to analyze the rail reflection image data 116 from each of the cameras 46, to determine rail alignment metrics. The processing device 80 may be configured to detect edge contours and/or points for the rails 20 in the reflection curve images 116, and to establish correspondences between such edge contours/ points and expected contours 22, 24 of the rails 20. Specific detection points in the rail reflection image data 116 may for example be matched (e.g. via known image registration techniques) to the upper edge portions 22 and the lateral inner edge portions 24 of the rails 20. The processing device 80 may associate particular images from the reflection image data 116 with particular orientation and position data entries 106, 108 corresponding to particular locations along the track 18. This allows the reflection image data 116 to be correlated with system kinematics, to generate rail geo-referenced rail geometry data 122. The processing device 80 may further be configured to determine spatial dimensions between detected rail contours and/or points from the rail geometry data 122, to derive various rail geometry profiles 128 that describe particular geometry characteristics and their evolution as function of position along the track 18. The processing device 80 may further be configured to compare such rail geometry profiles 128 with predetermined profiles and dimensional ranges, in order to assess whether the measured rail dimensions are within acceptable ranges.

The two laser scanners 50 are provided at a front side 35 of the frame 32. Each of the laser scanners 50 is adapted to dynamically acquire laser reflection/ranging data 146 from objects in the surroundings of the track 18. The first laser scanner 50a is located near a first lateral side of the frame 32, and is configured to acquire laser reflection/ranging data 146a of a first portion of the surroundings that includes the rails 20. Similarly, the second laser scanner 50b is located near a second lateral side of the frame 32, which is laterally opposite to the first lateral side. The second laser scanner 50b is configured to acquire laser reflection/ranging data 146b of a second portion of the surroundings that also includes the rails 20. This arrangement of the laser scanners 50 allows better spatial coverage and acquisition of more laser reflection data points.

Each of the laser scanners 50 includes a laser source 51 and a laser detector 52. Each laser source 51 is adapted to be rotated over 360° about a respective scan rotation axis B, and to emit a laser beam 54 (not shown) in a direction that is essentially perpendicular to and radially away from this scan rotation axis B. The rotatability of the laser source 51 allows the laser beam 54 to be swept along an angular direction around the scan rotation axis B. The emitted laser beam 54 may have a pulsed character or a continuous wave character. During scanning, each laser beam 54 is rotated to trace out a circular trajectory around the scan rotation axis B. The laser detector 52 is configured to detect a beam portion that is (specularly) reflected by a small patch of a structure ("point of reflection") within the track surroundings, back towards the laser scanner 50. When the railway vehicle 10 and system 30 are moved along the track 18 during an inspection run, the rotating laser beams 54 will trace out skewed helical trajectories, if viewed in a track-based coordinate frame.

In the exemplary system 30 of FIGS. 1-2, the two scan rotation axes Ba, Bb of the respective laser scanners 50a, 50b both extend from the front side 35 of the frame 32, with a large component along the positive longitudinal direction +X and with a smaller component along the negative vertical direction −Z. In addition, the scan rotation axis B of each laser scanner 50 extends with a smaller component outwards in the transverse direction (i.e. the first scan rotation axis Ba towards the negative transverse direction −Y, and the second scan rotation axis Bb towards the positive transverse direction +Y). The resulting inclined outward arrangement of the laser scanners 50 ensures that a good field of view is obtained, and increases the likelihood of detecting certain objects in the surroundings of the track 18 (e.g. objects that extend predominantly vertical and are arranged along or perpendicular to the track 18). The spatial configuration of the laser scanners 50 allows light detection and ranging of the track 18 and its surroundings, while minimizing shadowing effects (i.e. obstruction of the two laser scanners 50 by each other, by the frame 32, or by the railway vehicle 10). The resulting spatial configuration thus allows optimal scanning coverage of the surroundings.

During scanning, each laser scanner 50 rotates at a speed of about 12000 rotations per minute (rpm), while the laser source 51 emits the laser beam and the laser detector 52 simultaneously senses laser beam reflections. In this example, a pulsed laser scanner 50 is used. In this case, a time difference between the emission and subsequent reception of a laser beam pulse is used to compute a distance between the laser source 51 and the point of reflection. Each laser scanner 50 is adapted to detect and record 1 million reflection points per second during scanning. In systems with a continuous wave laser source, beam-focusing effects may be measured by the laser detector to determine ranging distances.

Each detected reflection point in the laser ranging data 146 can be associated with a position in 3D space, by correlating the predetermined position of the respective laser scanner 50 (relative to the positioning device 60) with the orientation and position data 106, 108 from the positioning device 60. This allows generation of a geo-referenced three-dimensional point cloud 150 of the reflection points along the surveyed portion of the surroundings of the track 18. This georeferenced 3D point cloud data 150 can be used to analyze track layout and the positions of structures that surround the track 18.

The system 30 further comprises a panoramic camera 70, which is mounted at the front side 35 near a central upper region of the frame 32. The panoramic camera 70 may be used to augment the 3D point cloud data 150 with panoramic image data of the area in front of the train 10. The panoramic image data may be used for inspection and visualization, and/or for coloring the 3D point cloud data 150.

Figure 3:
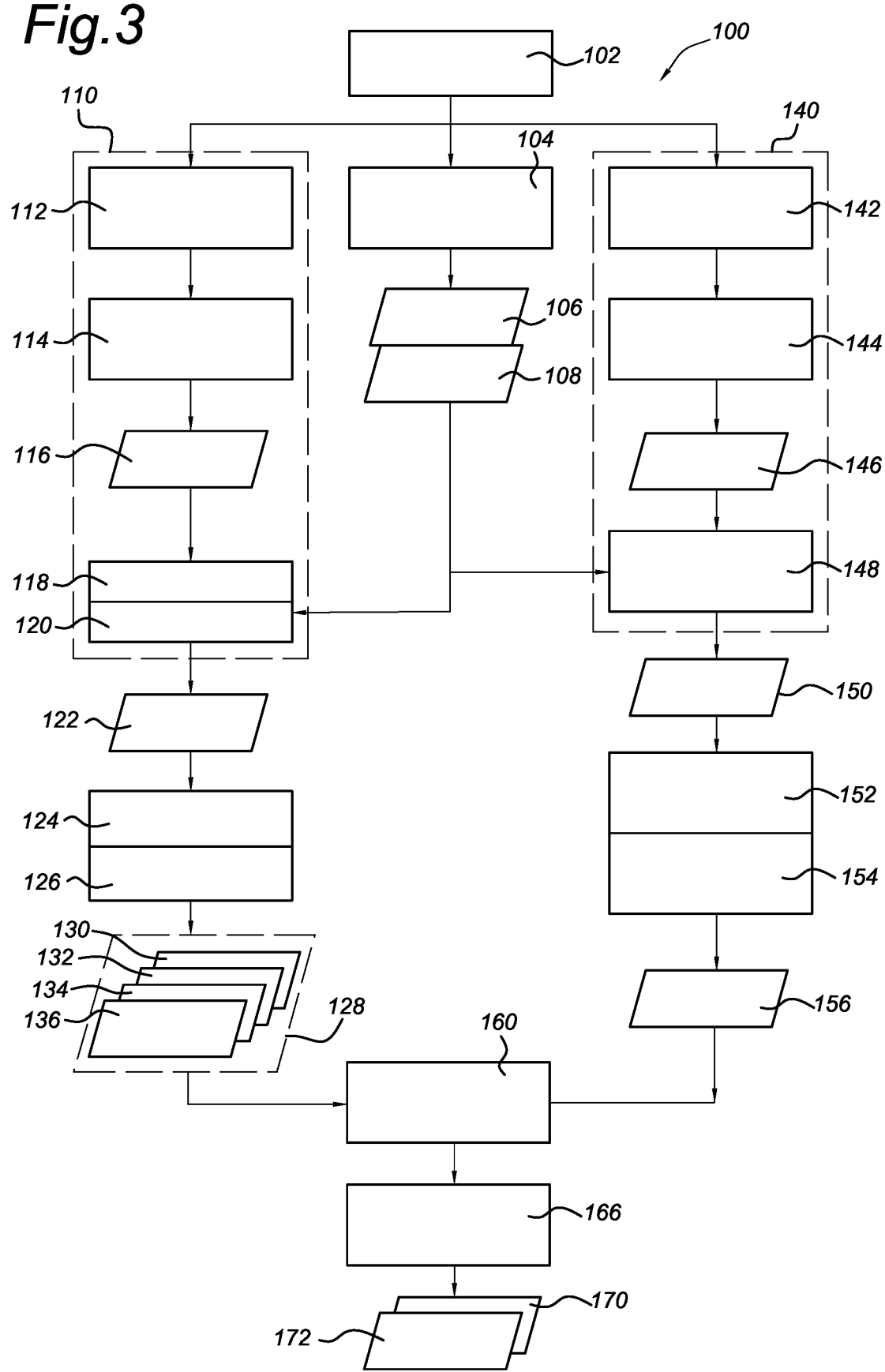
FIG. 3 presents a flow diagram of a railway mapping method according to an embodiment.

FIG. 3 shows a flow diagram for an exemplary method 100 for mapping a section of a railway track 18. The exemplary method 100 includes:

moving 102 a mapping system 30 along a plurality of locations Xi within the track section;

acquiring 104 system orientation data 106 and system position data 108 associated with positions and orientations of the mapping system 30 at or near the plurality of locations Xi;

acquiring 110 geo-referenced rail geometry data 122 associated with geometries of the first and second rails 20a, 20b at or near the plurality of locations Xi along the track 18;

acquiring 140 geo-referenced 3D point cloud data 150, which includes point data corresponding to the two rails 20 and surroundings of the track 18 along the section;

deriving 126, 154 track profiles 128, 156 for the track 18 in the geo-referenced rail geometry data 122 and the geo-referenced 3D point cloud data 150, and comparing 160 the track profiles 128, 156 and generating 166 enhanced geo-referenced rail geometry data 170 and/or enhanced geo-referenced 3D point cloud data 172 based on the comparison.

In this example, acquisition 104 of orientation data 106 and position data 108 involves combining the orientation data 106 from the IMU 62 and the position data 108 from the GNSS receiver 64, to calculate exact orientation coordinates (e.g. Euler angles, or pitch, roll, and yaw) and position coordinates (e.g. $X_r, Y_r, Z_r$) for the frame 32 of the mapping system 30, at the plurality of locations Xi within the section of the track 18. Accurate determination of positions may rely on additional data that is received from a reference GNSS network, to supplement the GNSS signals 69 received directly from the plurality of GNSS satellites 68. The position and orientation of the system 30 may thus be expressed as a function of location within the section of the track 18, to yield system trajectory data. Such system trajectory data may for example be expressed in a coordinate system that is fixed with respect to the track 20. This fixed coordinate system may for example be a global coordinate system, like ERTS89 in Europe or NAD83 in the United States of America. Absolute positions and orientations for the system 30 may be re-calculated in a post-processing stage, to improve accuracy of the orientation and position data 106, 108.

The steps of acquiring 110 geo-referenced rail geometry data 122, acquiring 140 geo-referenced 3D point cloud data 150, deriving 126, 154 track profiles 128, 156, and comparing 160 track profiles and generating 166 enhanced data 170, 172 are further explained below.

In the example shown in FIG. 3, the acquisition 110 of geo-referenced rail geometry data 122 includes acquisition 114 of two-dimensional images 116 with outlines of both rails 20 at or near the plurality of locations along the track 18, and generation 120 of the geo-referenced rail geometry data 122 by combining the set of 2D images 116 with the orientation 106 and position data 108.

In this example, the 2D images 116 are acquired 114 by projecting 112 fan beams of light 42 onto the rails 20 at the plurality of locations Xi along the track 20 (by continuously or intermittently irradiating the rails 20 with the light beams 42 from the projectors 40), while the system 30 is moved along the track 18. Beam reflections form the respective rails 20 may then be received, to acquire 114 the reflection image data 116.

The rail reflection image data 116 acquired in step 114 may for example include reflections by upper and lateral edge portions 22, 24 of the rails 20. Detection 118 of rail edges in the reflection image data 116 may involve the use of automated machine vision techniques, e.g. based on edge detection and/or shape recognition algorithms. The processor device 80 may for example be configured examine the intensity and/or color of each pixel in the reflection images 116, to identify regions in the reflection images 116 that correspond to the reflection curves 44 generated by the fan beams 42. More advanced techniques, like gradient-based image filtering, shape matching, etc. may be used.

The edge detection data is then combined with the orientation and position data 106, 108 from the positioning device 60, and with the predetermined positions of the light projector devices 40 and the imaging devices 46 relative to the positioning device 60, to correlate detected rail edges in the rail reflection image data 116 with positions and orientations in three-dimensional space, and to generate 120 the geo-referenced rail geometry data 122.

The positions of the rails 20 as continuous curves in three-dimensional space are then determined 124 from the geo-referenced rail geometry data 122. In addition, one or more track profiles 128 are derived 126 from the rail geometry data 122. In this example, the track profiles 128 are parameters relating to the geometry of the rails 20 as a function of position along the track section. Deriving 126 the track profiles 128 may include one or more of:

determining local track centerline points Yc from the rail geometry data 122 at or near the various locations Xi along the track 18, and associating the set of determined track centerline points {Yc} with the system position data 108 to determine a first centerline profile 130 for the track 18 as a function of track distance;

determining local gauge values ΔYt between inner lateral edges 24 of the rails 20 at or near the various locations Xi along the track 18, and associating the set of determined local rail gauge values {ΔYt} with the system position data 108 to determine a gauge profile 132 for the track 18 as a function of track distance;

determining local elevation values Zt for the track 18 at or near the various locations Xi along the track 18, and associating the set of determined local elevation values {Zt} with the system position data 108 to determine an elevation profile 134 for the track 18 as a function of track distance, and determining local cant values ΔZt (not shown) for the rails 20 at or near the various locations Xi along the track 18, and associating the set of determined local cant values {ΔZt} with the system position data 108 to determine a cant profile 136 for the track 18 as a function of track distance;

In the exemplary method 100 shown in FIG. 3, the acquisition 140 of three-dimensional point cloud data 150 includes acquisition 144 of three-dimensional laser ranging data 146 with point data corresponding to the two rails 20 and surroundings along the section of the track 18, and generation 148 of the geo-referenced 3D point cloud data 150 by combining the set of 3D reflection data 146 with the orientation 106 and position data 108.

In this example, the laser ranging data 146 is acquired 144 by scanning 142 one or more laser beams 56 across portions of the surroundings of the track 20 (e.g. by the rotating sources 52 of laser scanners 50), while the system 30 is moved along the track 18. Reflections of the laser beams 56 by the surroundings may then be detected (e.g. by the rotating detectors 54 of laser scanners 50), to acquire 144 the laser ranging data 146. The laser beams 56 may be formed by continuous wave radiation, or by a sequence of laser beam pulses.

In this example, acquisition 144 of ranging data 146 includes detecting reflections of the laser beams 56 that are reflected by points on nearby structures back towards the laser detector 54, and computing distances between the laser sources 52 and the reflection points associated with each received reflection.

Generation 148 of the geo-referenced 3D point cloud data 150 includes combining a predetermined position of the laser scanners 50 relative to the positioning device 60 with the received system orientation data 106 and system position data 108, and thereby associating each detected point in the laser ranging data 146 with a position in three-dimensional space.

Generation 148 of the geo-referenced 3D point cloud 150 may be executed in real time during the inspection run. The correspondences between, on the one hand, the orientation and position data 106, 108, and on the other hand, the detected points in the laser ranging data 146, may be stored on the data storage device 82 during the inspection run. The stored data 106, 108, 146 may then be retrieved from the data storage device 82 after completion of the inspection run, and used in a post-processing stage to generate the geo-referenced 3D point cloud 150.

The positions of the rails 20 as functions along the section of the track 18 are determined 152 from the geo-referenced 3D point cloud data 150. An automated curve detection algorithm may assist determination 152. Such a detection algorithm may be initialized based on knowledge of the rail positions determined 124 from the geo-referenced rail geometry data 122.

In a further calculation step, a second track centerline profile 156 is derived 154 from the 3D point cloud data 150. In this example, deriving 154 includes determining further track centerline points from the 3D point cloud data 150 at various locations along the track 18, and associating the set of further track centerline points with the position data 108, to generate the second centerline profile 156 for the track 18 as a function of track distance. Other track profiles relating to the geometry of the rails 20 as a function of position along the track section may be derived from the 3D point cloud data 150, for example a second elevation profile.

The information of the track 18 and surroundings in the acquired geo-referenced data sets 122, 150 may be compared 160 and/or combined, to allow track mapping with improved accuracy. In the example of FIG. 3, the track profiles 128 from the rail geometry data 122 may be compared 160 to the track profiles 156 from the 3D point cloud data 150. For instance, the first centerline profile 130 may be compared to the second centerline profile 156. Alternatively or in addition, the first elevation profile 134 from the rail geometry data 122 may be compared to the second elevation profile from the 3D point cloud data 150.

Based on the comparison 160, enhanced geo-referenced rail geometry data 170 and/or enhanced geo-referenced 3D point cloud data 172 is generated 166. Data comparison 160 and generation 166 may be based on various metrics and correction methodologies. In further embodiments of the method, additional information from data sets acquired via supplementary inspection runs may be taken into account.

FIG. 4 illustrates that the method 100 may include inspection runs for different tracks. The mapping system 30 may for example be moved along each the adjacent tracks 18, 19 shown in FIG. 1. During each inspection run, the mapping system 30 is moved along one of the two tracks 18, 19. Each track 18, 19 is traveled at least once during an inspection run dedicated to that particular track.

During at least one inspection run (the "first inspection run"), the system 30 is moved with the railway vehicle 10 along a section of the first track 18. For this first inspection run, the acquisition of rail reflection image data 116, geo-referenced rail geometry data 122, etc., for the first track 18 proceeds as described above with reference to FIG. 3. Positions of the rails 20 as functions along the section of the first track 18 are determined 124 from the geo-referenced rail geometry data 122. One or more track profiles 128 are then derived 126, among which a first centerline profile 130 for the first track 18 as a function of track distance.

During this first inspection run, the laser sources 52 of scanners 50 scan 142 the laser beams 56 across the first track 18 and its surroundings, and thereby scan across the second track 19 as well. The laser detectors 54 detect beam reflections from the rails 20, 21 of both tracks 18, 19. The resulting geo-referenced 3D point cloud data 150 for this first inspection run thus includes point data corresponding to the rails 20, 21 of both tracks 18, 19.

The positions of the rails 20 of the first track 18 and the rails 21 of the second track 19 are determined 152 in the geo-referenced 3D point cloud data 150 from the first inspection run. From this, a second track centerline profile 156 for the first track 18 and an adjacent centerline profile 157 for the second track 19 are derived 154 from the 3D point cloud data 150.

During at least one other inspection run (the "second inspection run"), the system 30 is moved on and along the second track 19. During this second inspection run, the system 30 may be coupled to the same railway vehicle 10, which has been moved to the second track 19 prior to this inspection run. Alternatively, the system 30 may be coupled to another railway vehicle (not shown) that was already located on the second track 19 prior to the second inspection run. It should be understood that the terms "first inspection run" and "second inspection run" are used here only to distinguish the inspection runs, but should not be construed in a limiting manner by suggesting a particular ordering in time.

During the second inspection run, fan beams 42 are projected onto the second rails 21, and the cameras 46 gather further rail reflection image data based on received reflections. During this second run, the positioning device 60 acquires orientation data 107 and position data 109 at various system positions along the second track 19. Acquisition of further geo-referenced rail geometry data 123, etc. proceeds analogous to FIG. 3, but now for the second track 19.

Positions of the rails 20 as functions along the section of the second track 19 are determined 125 from the further geo-referenced rail geometry data 123. One or more further track profiles 129 are then derived 127 from the further geo-referenced rail geometry data 123, among which is a further centerline profile 131 for the second track 19 as a function of track distance.

During this second run, the laser scanner 50 may also be operated to scan the surroundings of the second track 19, and the first track 18 may also be covered by this scanning. This is, however, not required.

In this example, the step of comparing 160 includes calculating inter-track centerline distances $\Delta Yc1$ between track centerline points on the first centerline profile 130 and track centerline points on the further centerline profile 131. The calculated inter-track centerline distances $\Delta Yc1$ are then expressed as a function of position along the tracks, to yield a first inter-track distance profile 162.

The comparing 160 also includes calculating inter-track centerline distances $\Delta Yc2$ between track centerline points on the second centerline profile 156 and track centerline points on the adjacent centerline profile 157. The calculated inter-track centerline distances $\Delta Yc2$ are also expressed as a function of position along the tracks, yielding a second inter-track distance profile 164. Alternatively or in addition, the inter-track distance profiles 162, 164 calculated in step 160 may include inter-track elevation differences between points in the elevation profiles obtained from the rail geometry data sets 122, 123 and the 3D point cloud data 150.

In this example, step 166 involves generation of enhanced geo-referenced rail geometry data 170 based on the comparison 160 of the first and second distance profiles 162, 164. The data enhancement 166 involves adjusting of geo-reference correspondences for the geo-referenced rail geometry data 122 and the further geo-referenced rail geometry data 123, in order to let the first distance profile 162 converge towards the second distance profile 164. This approach is based on the assumption that an accuracy of inter-track distances determined from one set of geo-referenced 3D point cloud data 150 of one single inspection run is significantly better than an accuracy of inter-track distances derived from geo-referenced rail geometry data sets 122, 123 of two distinct inspection runs.

The adjusting of correspondences may involve spatial transformation of the orientation and position data 106-109, to generate the enhanced rail geometry data 170 based on transformed orientation/position data and original rail reflection image data (i.e. without modifying the latter). The search for an optimal transformation of the system orientation and position data 106-109 may proceed in an iterative manner. The resulting transformation parameters may be smoothed as a function of position along the track, before being applied. This may reduce the likelihood of creating discontinuities in the enhanced rail geometry data 170.

In alternative embodiments, spatial transformations may instead be applied to the original rail reflection data, to generate the enhanced geo-referenced rail geometry data 170 based on transformed rail reflection data and original orientation/position data (i.e. without modifying the latter).

Enhanced geo-referenced 3D point cloud data 172 may then be generated 166, based on the transformed (and possibly smoothed) orientation/position data and the original 3D point cloud data 150. This data enhancement 166 may further include searching for an optimal rigid body transformation (i.e. only rotations and translations) of the geo-reference correspondences for the 3D point cloud data 150, in order to let the centerline profiles 156, 157 in the 3D point cloud data 150 be spatially mapped onto the centerline profiles 130, 131 in the enhanced rail geometry data 170.

Optionally, the method may include generating 174 composite track data 176 by merging the enhanced geo-referenced rail geometry data 170 and the enhanced geo-referenced 3D point cloud data 172 into a single dataset. The resulting composite track data 176 may be used for display purposes.

The panoramic camera 70 may be used to acquire visual images of an area in front of the railway vehicle 10 during an inspection run. The known position of the panoramic camera 70 relative to the positioning device 60 and the acquired orientation and position data 106, 108 may then be used to associate each image in the panoramic image data with a position in three-dimensional space, to generate a set of geo-referenced panoramic images at subsequent positions along the track. To facilitate track analyses, the system may allow an operator to select a specific position (or sequence of positions) along the track. The system may then retrieve a corresponding geo-referenced panoramic image and a corresponding portion of enhanced rail data 170, enhanced 3D point cloud data 172, or composite track data 176, and add such data to the panoramic image (or image sequence) as an overlay.

FIG. 5 illustrates an alternative method 200 for mapping sections of railway tracks. Features and steps in the method 200 that have already been described above with reference to other method embodiments (and in particular FIGS. 3-4) may also be present in the method 200 shown in FIG. 5, and will not all be discussed here again. For the discussion with reference to FIG. 5, like features are designated with similar reference numerals preceded by 200.

The left side of FIG. 5 illustrates that in this example, the acquisition 204*j* of orientation and position data 206*j*, 208*j*, and acquisition 210*j* of geo-referenced rail geometry data 222*j* are executed multiple times for the same track 18. The labels j and k represent particular instances of a discrete index for generically indicating method steps and data associated with individual inspection runs. Repeated execution may be achieved via a sequence of individual inspection runs, or via simultaneous inspection runs by multiple systems 30 attached to the same railway vehicle 10. During each inspection run, the railway vehicle 10 is moved along (at least) the same section of the track, so that this particular track section is covered in all inspection runs for this track.

This method 200 also includes generating 220*m* averaged geo-referenced rail geometry data 222*m* based on spatially overlapping portions of the rail geometry data sets 222*j*, 222*k*. The label m is used to indicate an averaging step or its result. An average centerline profile 230*m* is calculated in step 226*m*. Other averaged track profiles may be generated as well, like an average cant profile, average gauge profile, and/or average elevation profile. The averaged track profiles may be calculated by averaging track profiles 228*j*, 228*k* derived for each rail geometry data set 222*j*, 222*k*.

The statistical spread of individual track profiles 228*j*, 228*k* relative to the associated average track profile 228*m* may be described in a point-wise manner, for example by calculating the local standard deviation (SD) from the local mean of the profile parameter as a function of position along the track section. In this way, a centerline SD profile σ1 may be derived with respect to the average centerline profile 230*m* for the first track 18. This centerline SD profile σ1 provides a metric for the amount of spatial spread between centerline points from each the individual centerline profiles 230*j* that are assumed to correspond to the same position along the track. This spread (i.e. the SD) is determined for each position, and the set of such spread values along the track forms the centerline SD profile σ1.

The right side of FIG. 5 illustrates that the procedure with multiple inspection runs and averaging for one track may be executed for an adjacent track 19 as well. Also for this track 19, averaged geo-referenced rail geometry data 223*m* and averaged track profiles 229*m* are generated in steps 221*m* and 227*m* respectively. A further averaged centerline profile 231*m* and a further centerline SD profile σ2 may also be derived for the second track 19.

In this case, comparing step 260 includes calculating inter-track centerline distances ΔYc1 between centerline points on the first average centerline profile 230*m* and centerline points on the further average centerline profile 231*m*, to derive a first inter-track distance profile 262. The comparing 260 also includes calculating inter-track centerline distances ΔYc2 between centerline points on the second centerline profile 256 and centerline points on the adjacent centerline profile 257, to derive a second inter-track distance profile 264.

In generation step 266, the spread values per position from the centerline SD profiles 61 and σ2 are used as weighting factors for the amount of adjustment that each of the geo-reference correspondences for the rail geometry data sets 222*m* and 223*m* should receive. For instance, when the centerline SD profile σ1 includes larger spread values for specific positions than the spread values for the corresponding positions from the further centerline SD profile σ2, then the adjustments of the geo-reference correspondences for averaged rail geometry data set 222*m* is made larger at these positions than the adjustments for the averaged rail geometry data set 223*m*. In alternative embodiments, the weighting factors may be based on other statistical dispersion characteristics for data sets 222*j*, 223*j* and/or 228*j*, 229*j*.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. It will be apparent to the person skilled in the art that alternative and equivalent embodiments of the invention can be conceived and reduced to practice. All changes which come within the meaning and range of equivalency of the claims are to be embraced within their scope.

Note that for reasons of conciseness, the reference numbers corresponding to similar elements in the various embodiments (e.g. method step 210 being similar to method step 110) have been collectively indicated in the claims with only the lowest most significant digit. However, this does not suggest that the claim elements should be construed as referring only to features corresponding to those numbers. Although the similar reference numbers have been omitted from the claims, their applicability will be apparent from a comparison with the figures.

Other implementations of the disclosed inspection system may use alternative light sources that produce EM radiation with different wavelengths and/or angular spreads. Alternatively or in addition, 3D point cloud data may be acquired by imaging methods other than laser light detection and ranging-based techniques. For example, the 3D point cloud data may be derived from dense image matching techniques applied to a set of two-dimensional images acquired at successive positions along the track.

In the above-mentioned exemplary embodiment, the inspection system was mountable on a front side or rear side of a train. In alternative embodiments, the system may be mounted elsewhere onto a railway vehicle, in order to maintain the inspection system in a proper position with respect to the track.

Those skilled in the art and informed by the teachings herein will realize that the disclosed system and method can be used in other areas, such as on trams, in subways, or other vehicles or movable structures that travel along a fixed track with rails.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both, wherein the technical effect is to provide a system for inspecting and/or mapping a railway track. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

LIST OF REFERENCE SYMBOLS

Similar reference numbers that have been used in the description to indicate similar elements (but differing only in the hundreds) have been omitted from the list below, but should be considered implicitly included.

10 railway vehicle (e.g. train)
12 vehicle front side
14 vehicle lateral side
16 vehicle coupling mechanism
18 first track
19 second track
20 rail of first track
21 rail of second track
22 upper rail edge portion (e.g. rail head)
24 inner lateral rail edge portion
26 track bed
28 crosstie (sleeper)
30 rail mapping system
32 frame
33 lower frame side
34 upper frame side
35 front frame side
36 rear frame side
38 mounting mechanism
40 light projector device (e.g. laser-based fan beam projector)
42 collimated light beam (e.g. laser fan beam)
44 reflection curve
46 image acquisition device (e.g. camera)
50 laser scanner
52 laser source (e.g. rotatable)
54 laser detector (e.g. rotatable)
56 laser beam
58 reflected beam portion
60 positioning device
62 inertial measurement unit (IMU)
64 GNSS receiver
66 GNSS antenna
67 mounting pole
68 GNSS satellite
69 GNSS satellite signal 70 panoramic camera
80 processing device
82 data storage device
100 track mapping method
102 move system along track
104 acquire system orientation and position data
105 acquire further system orientation and position data
106 system orientation data
108 system position data
110 acquire rail geometry data
111 acquire further rail geometry data
112 irradiate rails with light beam
114 acquire rail reflection images
116 rail reflection image data
118 detect rail geometry (e.g. rail edges)
120 generate rail geometry data (apply geo-referencing)
122 geo-referenced geometry data (e.g. rail edge data)
123 further geo-referenced geometry data (e.g. further rail edge data)
124 determine rail positions
126 derive track profile (e.g. derive rail geometry profiles)
127 derive further track profile (e.g. derive further rail geometry profiles)
128 track profiles (e.g. rail geometry profiles)
129 further track profiles (e.g. further rail geometry profiles)
130 first centerline profile
131 further centerline profile
132 gauge profile
134 elevation profile
136 cant profile
140 acquire 3D point cloud
141 acquire further 3D point cloud
142 laser scan surroundings
144 acquire ranging data
146 laser ranging data
148 generate 3D point cloud (apply geo-referencing)
150 geo-referenced 3D point cloud data
152 determine rail positions
154 derive track profile (e.g. derive track centerlines)
156 second centerline profile
157 adjacent centerline profile
160 compare profiles (e.g. compare centerlines)
162 first inter-track distance profile
164 second inter-track distance profile
166 generate enhanced data
168 adjust inter-track rail geometry data sets
170 enhanced geo-referenced rail geometry data
172 enhanced geo-referenced 3D point cloud data
174 merge enhanced rail geometry data and 3D point cloud data
176 composite track data (e.g. combined geo-referenced data)
180 acquire visual images with panoramic camera
182 panoramic image data
184 geo-referenced panoramic image data
X first direction (longitudinal direction)
Y second direction (transversal direction)
Z third direction (vertical direction)
Yc1 centerline point for $1^{st}$ track
Yc2 centerline point for $2^{nd}$ track
61 standard deviation for $1^{st}$ track
σ2 standard deviation for $2^{nd}$ track
ΔYc inter-track centerline distance (local distance between centerlines of tracks)
Zt track elevation (local value)
ΔZt track cant (local value)
ΔYt track gauge (local value)
A fan beam axis
B scan rotation axis
O system origin
R radial direction
Φ angular direction (azimuthal direction)
ψ fan beam tilt angle
Δψ fan beam width

The invention claimed is:

1. A method for mapping a section of a railway track, the method comprising:
   acquiring b a positioning device orientation data and position data at a plurality of locations along the section of the track while moved along the track;
   acquiring, by a first acquisition device, two-dimensional (2D) images including outlines of two rails at or near the plurality of locations;
   acquiring, by a second acquisition device, three-dimensional (3D) laser ranging data, which includes point data corresponding to the two rails and surroundings of the track along the section;
   generating, by a processing device, geo-referenced rail geometry data associated with geometries of two rails of the track along the section, by combining the 2D images with the orientation and position data;
   generating, by a processing device, geo-referenced 3D point cloud data, which includes point data corresponding to the two rails and surroundings of the track along the section;
   deriving, by a processing device, track profiles of the track from the geo-referenced 3D point cloud data and the geo-referenced rail geometry data; and
   comparing, by a processing device, the track profiles, and generating enhanced geo-referenced rail geometry data or enhanced geo-referenced 3D point cloud data or both, based on the comparison.

2. The method according to claim 1, wherein the track profiles further comprise:
   a first centerline profile of the track in the geo-referenced rail geometry data;
   a second centerline profile of the track in the geo-referenced 3D point cloud data;
   a further centerline profile of an adjacent track in further acquired geo-referenced rail geometry data;
   an adjacent centerline profile of the adjacent track in the geo-referenced 3D point cloud data,
   a first distance profile defined between the first centerline profile and the further centerline profile, and
   a second distance profile defined between the second centerline profile and the adjacent centerline profile.

3. The method according to claim 2, wherein generating the enhanced geo-referenced 3D point cloud data includes adjusting geo-reference correspondences for the geo-referenced 3D point cloud data, so as to let the second centerline profile and the adjacent centerline profile converge towards the first centerline profile and the further centerline profile respectively.

4. The method according to claim 1, wherein generating the enhanced geo-referenced rail geometry data includes adjusting geo-reference correspondences for the geo-referenced rail geometry data and further acquired geo-referenced rail geometry data, so as to let a first distance profile converge towards a second distance profile.

5. The method according to claim 4, wherein the geo-reference correspondences are adjusted based on weighted contributions, including a first weight associated with the track profile of the track in the geo-referenced rail geometry data, and a second weight associated with a further track profile of an adjacent track in the further acquired geo-referenced rail geometry data.

6. The method according to claim 4, wherein the geo-reference correspondences are adjusted based on weighted contributions, including a first weight associated with the track profile of the track in the geo-referenced rail geometry data, and a second weight associated with a further track profile of an adjacent track in the further acquired geo-referenced rail geometry data,
wherein the geo-referenced rail geometry data comprises a plurality of overlapping data sets associated with the section of the track, and the track profile is an average of track profiles for the overlapping data sets,
wherein the further geo-referenced rail geometry data comprises a plurality of further overlapping data sets associated with a co-extending section of the adjacent track, and the further track profile is an average of further track profiles for the further overlapping data sets, and
wherein the first weight is a quantity of dispersion for the overlapping data sets with respect to the average of the track profiles, and wherein the second weight is a quantity of dispersion for the further overlapping data sets with respect to the average of the further track profiles.

7. The method according to claim 1, wherein the geo-referenced rail geometry data comprises a plurality of overlapping data sets associated with the section of the track, and the track profile is an average of track profiles for the overlapping data sets.

8. The method according to claim 1, further comprising:
generating composite track data by merging the enhanced geo-referenced rail geometry data and the enhanced geo-referenced 3D point cloud data into a single dataset.

9. The method according to claim 1, wherein acquiring the 2D images comprises:
projecting at least one collimated light beam towards each or both of the two rails of the track; and
receiving reflected beam portions from the respective rails, to acquire reflection image data at or near the plurality of locations along the section of the track.

10. The method according to claim 1, wherein acquiring the 2D images comprises:
scanning at least one laser beam transversely across each or both of the two rails; and
receiving reflected beam portions from the respective rails, to acquire ranging data at or near the plurality of locations along the section of track.

11. The method according to claim 1, wherein acquiring geo-referenced 3D point cloud data comprises:
scanning a laser beam across the two rails and a portion of the surroundings of the track;
detecting reflections of the laser beam from the two rails and the surroundings, to acquire ranging data that includes point data corresponding to the two rails and surroundings along the section of the track; and
generating the geo-referenced 3D point cloud data by combining the ranging data with the orientation and the position data.

12. The method according to claim 11, wherein acquiring georeferenced 3D point cloud data further comprises:
scanning the laser beam across two further rails of a co-extending section of an adjacent railway track; and
detecting reflections of the laser beam from the two further rails, so that the acquired ranging data also includes point data corresponding to the two further rails along the co-extending section of the adjacent track.

13. A system for mapping a section of a railway track, the system comprising:
a positioning device configured to acquire orientation data and position data at a plurality of locations along the section of the track while the system is moved along the track;
a first acquisition device configured to acquire two-dimensional (2D) images including outlines of two rails at or near the plurality of locations;
a second acquisition device configured to acquire three-dimensional (3D) laser ranging data including point data corresponding to the two rails and surroundings along the section of the track; and
a processing device, configured to:
generate geo-referenced rail geometry data associated with geometries of two rails of the track along the section, by combining the 2D images with the orientation and position data;
generate geo-referenced 3D point cloud data, which includes point data corresponding to the two rails and surroundings of the track along the section;
derive track profiles for the track from the geo-referenced 3D point cloud data and the geo-referenced rail geometry data; and
compare the track profiles, and generate enhanced geo-referenced rail geometry data or enhanced geo-referenced 3D point cloud data or both, based on the comparison.

14. The system according to claim 13, wherein the second acquisition device is a laser scanner configured to scan a laser beam across the two rails and a portion of the surroundings of the track, and across two further rails of a co-extending section of an adjacent railway track, and configured to detect laser beam reflections and acquire ranging data that includes point data corresponding to the two rails and the surroundings along the section of the track, as well as the two further rails along the co-extending section of the adjacent track.

15. The system according to claim 13, comprising a frame with a mounting mechanism for attaching the system to a railway vehicle, wherein the positioning device, the first acquisition device, and the second acquisition device are fixed to the frame at predetermined positions.

16. The system according to claim 13, wherein the processing device is further configured to:
generate further geo-referenced rail geometry data associated with geometries of two further rails extending along a co-extending section of an adjacent railway track;
generate the geo-referenced 3D point cloud data, including further point data corresponding to the two further rails of the adjacent railway track;
derive further track profiles for the adjacent track from the geo-referenced 3D point cloud data and the further geo-referenced rail geometry data;
determine distance profiles associated with transverse distances or elevation differences between the track profiles and the further track profiles; and
generate the enhanced geo-referenced rail geometry data or enhanced geo-referenced 3D point cloud data, based on the distance profiles.

17. A non-transitory computer readable medium, storing instructions, which when executed by one or more processors, causes the one or more processors to:

receive orientation data and position data at a plurality of locations along a section of a track while being moved along the track, wherein the orientation data and position data are acquired by a positioning device;

receive two-dimensional (2D) images including outlines of two rails at or near the plurality of locations, wherein the 2D images are acquired by a first acquisition device;

receive three-dimensional (3D) laser ranging data including point data corresponding to the two rails and surroundings along the section of the track, wherein the 3D laser ranging data is acquired by a second acquisition device;

generate geo-referenced rail geometry data associated with geometries of two rails of the track along the section, by combining the 2D images with the orientation and position data;

generate geo-referenced 3D point cloud data, including point data corresponding to the two rails and surroundings of the track along the section;

derive track profiles for the track from the geo-referenced 3D point cloud data and the geo-referenced rail geometry data;

compare the track profiles, and generate enhanced geo-referenced rail geometry data or enhanced geo-referenced 3D point cloud data or both, based on the comparison.

18. The non-transitory computer readable medium of claim 17, wherein the instructions, when executed by the one or more processors, further causes the one or more processors to:

generate further geo-referenced rail geometry data associated with geometries of two further rails extending along a co-extending section of an adjacent railway track;

generate the geo-referenced 3D point cloud data, including further point data corresponding to the two further rails of the adjacent railway track;

derive further track profiles for the adjacent track from the geo-referenced 3D point cloud data and the further geo-referenced rail geometry data;

determine distance profiles associated with transverse distances or elevation differences between the track profiles and the further track profiles; and generate the enhanced geo-referenced rail geometry data or enhanced geo-referenced 3D point cloud data, based on the distance profiles.

* * * * *